3,207,012
RECYCLING MECHANISM FOR
MACHINE TOOLS
Sylvester R. Cudnohufsky, 3650 Lepeer Road,
Pontiac, Mich.
Filed July 13, 1961, Ser. No. 123,730
9 Claims. (Cl. 82—14)

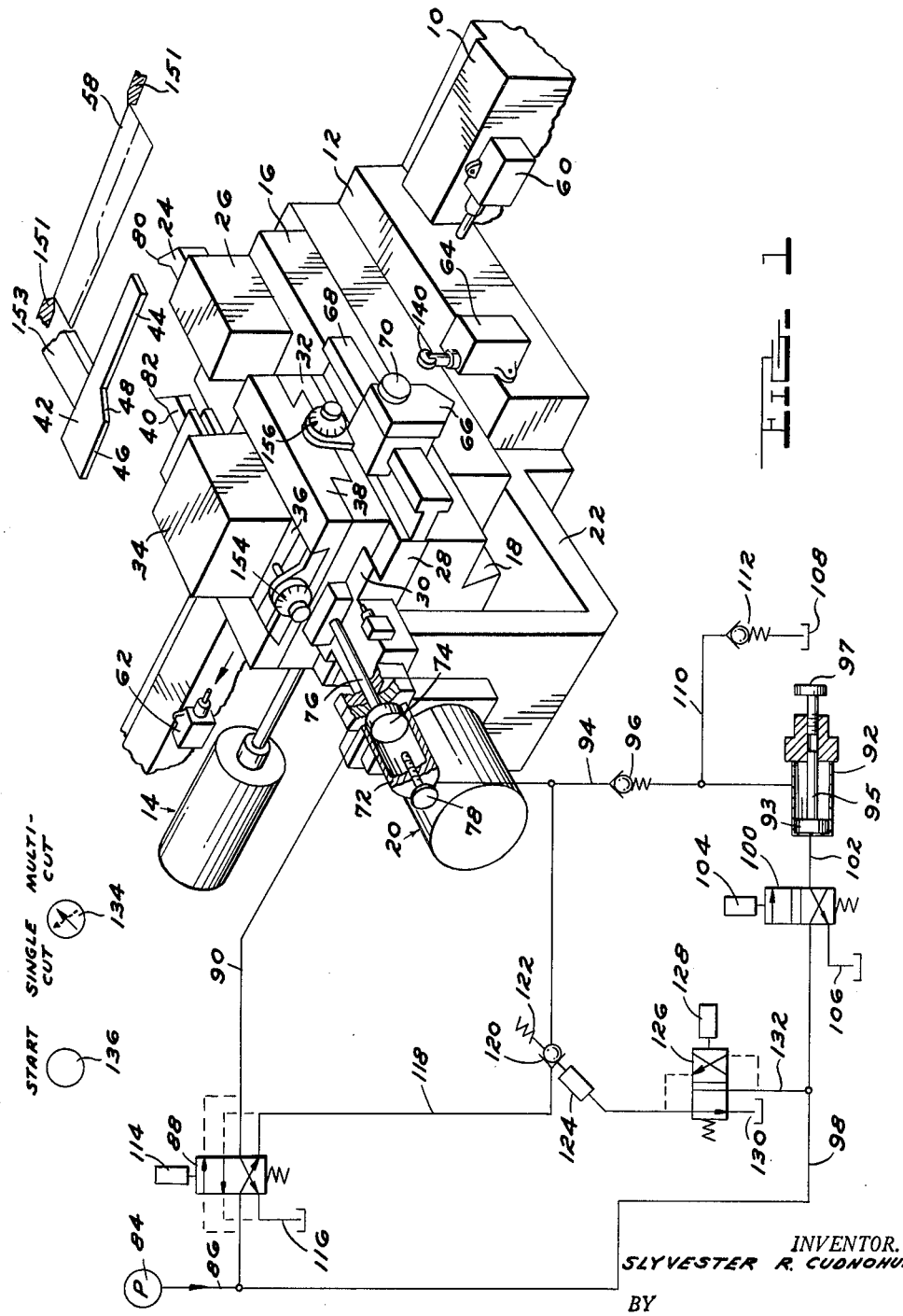

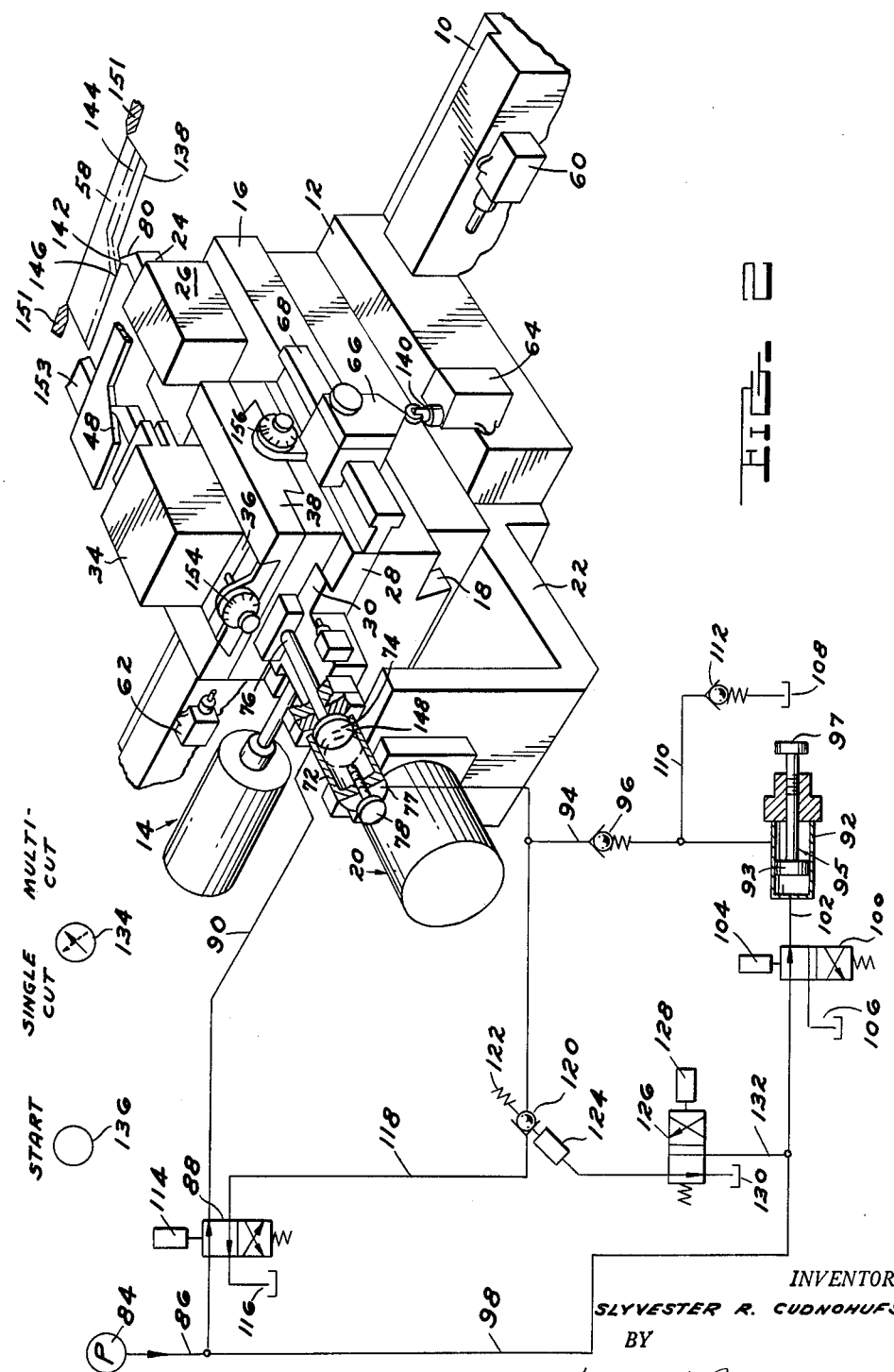

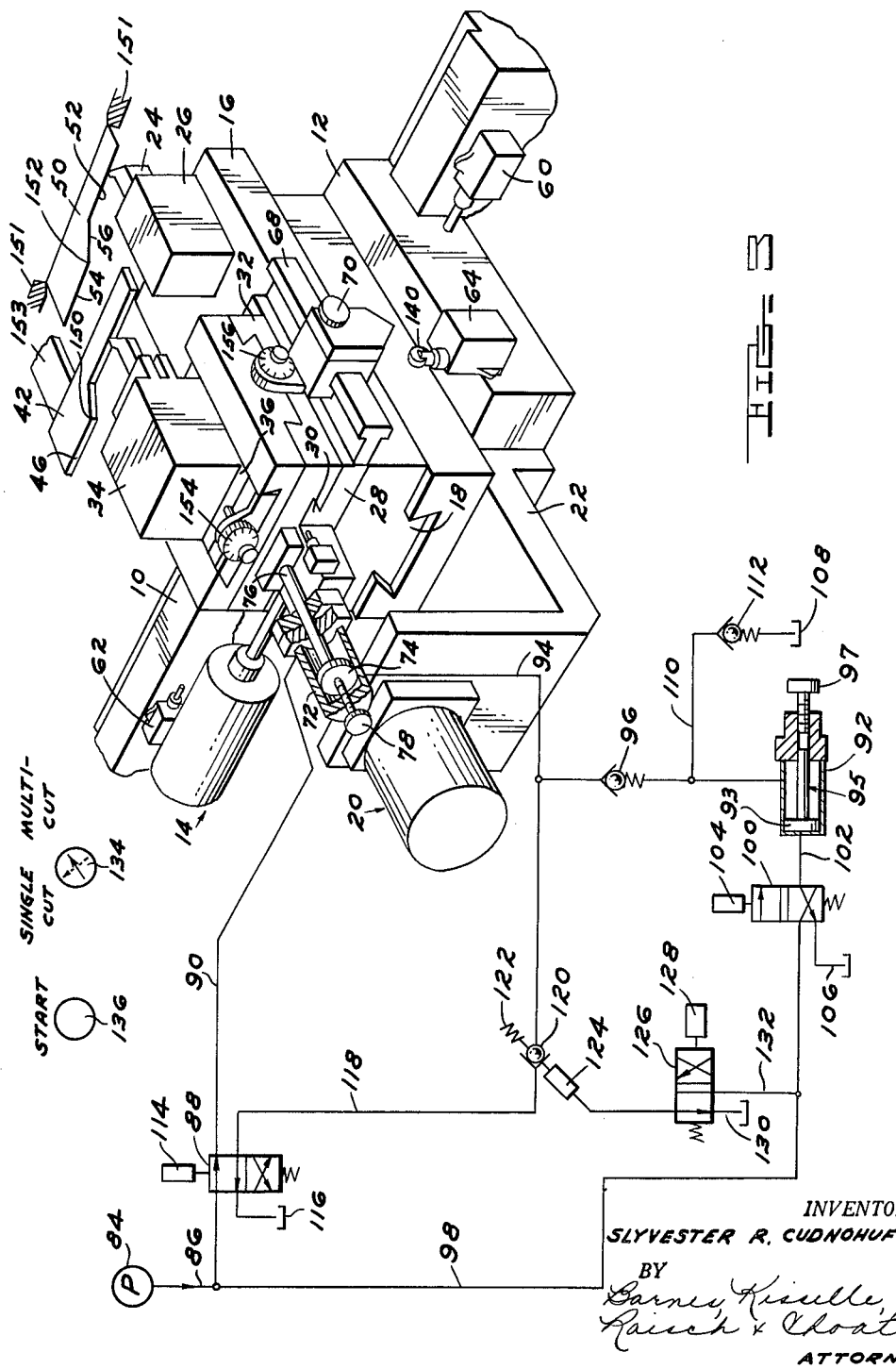

This invention relates to machine tools and more particularly to a mechanism for automatically recycling a machine tool so as to produce successive cuts on a work piece until the work piece is machined down to its final desired dimensions.

It is an object of the present invention to provide a mechanism for a tracer controlled machine tool which automatically recycles the cutting tool through successive cutting operations on the work piece until such time as the work piece is down to its final dimension and thereafter automatically position the cutting tool in a retracted out of the way position to enable loading another work piece to be machined.

A further object of the invention is to provide a recycling mechanism of the type described which is controlled primarily by a hydraulic fluid system.

A further object of the invention is to provide a recycling mechanism of the type described wherein means are provided for successively increasing the distance between the stylus of a tracer and the cutting tool by a predetermined increment equal to the depth of cut desired on the next successive pass of the cutting tool.

In the drawings:

FIG. 1 is a perspective view, somewhat diagrammatic, showing the recycling mechanism of the present invention in the idling condition with the cutting tool and tracer stylus in the retracted position.

FIG. 2 is a view similar to FIG. 1 showing the elements in the positions they respectively assume when the first cut is being taken on the work piece.

FIG. 3 is a view similar to FIG. 1 showing the elements in the positions they respectively assume when the final finish cut is being made.

The recycling mechanism of the present invention is adapted for use with any machine tool wherein a series of repetitive machining operations such as turning, grinding, etc. are made under the control of a tracer to machine the work piece down to a finished size. For the purpose of illustration, the recycling mechanism is illustrated in conjunction with a turning operation, in which case the machine tool comprises a lathe. The lathe includes a bed 10 on which a carriage 12 is mounted for longitudinal reciprocation. Carriage 12 is actuated by a piston-cylinder assembly 14. A cross slide 16 is mounted on carriage 12 for movement transversely of the longitudinal movement of carriage 12. Cross slide 16 is guided rectilinearly on carriage 12 by ways 18. A piston-cylinder assembly 20 mounted on a support bracket 22 on carriage 12 is adapted to reciprocate cross slide 16 on carriage 12. A cutting tool 24 is fixedly mounted on cross slide 16 by means of a tool support 26. On the top face of cross slide 16, there is mounted a plate 28 fashioned with a dovetail guideway 30 with which a slide 32 is engaged. Slide 32 is hereinafter referred to as the multicut slide as distinguished from the cross slide 16. Multicut slide 32 is arranged to be reciprocated on cross slide 16 in a path accurately parallel to the direction of movement of cross slide 16 on carriage 12. A tracer valve 34, mounted on multicut slide 32 by means of a pair of adjustable microslides 36, 38, is actuated by a stylus 40, the movement of which, as controlled by a fixedly mounted pattern or template 42, controls the operation of piston-cylinder assemblies 14 and 20 so that the cutting tool 24 will travel during the cutting operation in a path paralleling the contour of pattern 42.

For the purpose of illustration, the pattern or template 42 is contoured for machining or turning a spindle having cylindrical end portions of different diameters which are connected by a conical surface. Thus, the pattern 42 contains a straight edge 44 which corresponds to the cylindrical end of the spindle of smaller diameter, a straight edge 46 which corresponds to the cylindrical end of the spindle of larger diameter and an angularly inclined edge 48 which corresponds to the conical surface on the spindle to be machined. In FIG. 3, the finish machined spindle is illustrated diagrammatically at 50, the cylindrical surface at the smaller end being designated 52, the cylindrical surface at the larger end being designated 54 and the conical surface being designated 56. In practice, template 42 would be fixedly mounted on the bed of the lathe and the work piece blank, designated 58 in FIGS. 1 and 2, would be chucked for rotation between centers.

A pair of limit switches 60 and 62 are mounted on the bed 10 of the lathe so as to be actuated by carriage 12. Limit switch 60 is arranged to be actuated when the carriage 12 travels to the fully retracted position (to the right as viewed in the drawings) and limit switch 62 is adapted to be actuated when the carriage travels to the fully advanced position relative to the work piece being machined. A third limit switch 64 is mounted on carriage 12 and is adapted to be actuated by a tripper block 66 mounted on cross slide 16. Tripper block 66 is mounted for fore and aft adjustment on cross slide 16 by means of a guide bar 68. Tripper block 66 is arranged to be locked in its adjusted position by a clamping screw 70.

A small hydraulic cylinder 72 is fixedly mounted on guide plate 28 so that the cylinder is caused to move as a unit with cross slide 16. Within cylinder 72, there is slidably arranged a piston 74 having a rod 76 connected with the multicut slide 32. Actuation of piston 74 within cylinder 72 causes the multicut slide 32 to reciprocate on cross slide 16 in a direction parallel to the direction of travel of cross slide 16 on carriage 12. An adjusting screw 78 at the head end of cylinder 72 controls the maximum stroke of piston 74 in cylinder 72. As piston 74 travels in a direction toward the end of screw 78, the perpendicular distance between the cutting edge 80 of cutting tool 24 and the tracing tip 82 of stylus 40 in the direction of travel of cross slide 16 increases.

The rod end of cylinder 72 is conected to a hydraulic pump 84 by means of a conduit 86, a solenoid actuated four-way valve 88 and a conduit 90. The head end of cylinder 72 communicates with the rod end of a second cylinder 92 by means of a conduit 94 in which is arranged a spring-biased check valve 96 which prevents the flow of hydraulic fluid in a direction from cylinder 92 to cylinder 72. Within cylinder 92, there is arranged a piston 93 having a rod 95 which is adapted to abut against the end of an adjusting screw 97 threaded axially into the rod end of cylinder 92. The head end of cylinder 92 is conected with pump 84 by means of a conduit 98, a solenoid actuated valve 100 and a conduit 102. When the solenoid 104 of valve 100 is de-energized, the head end of cylinder 92 is connected to sump as at 106. The rod end of cylinder 92 is connected to sump as at 108 by means of a conduit 110 and an adjustable check valve 112. For reasons which will be apparent as the description proceeds, check valve 112 is adjusted so that it relieves only when the pressure in line 110 is substantially higher than the pressure developed by pump 84.

When solenoid 114 of four-way valve 88 is deenergized, the rod end of cylinder 72 is connected to sump as at 116 and the head end of cylinder 72 is connected to pump 84 by the branch conduit 118. Within branch conduit 118, there is arranged a check valve 120 normally biased to close as by a spring 122 and which can be opened by a hydraulically controlled pilot cylinder 124. Actuation of hydraulic cylinder 124 is controlled by a solenoid actuated valve 126. When solenoid 128 of valve 126 is de-energized, cylinder 124 is connected through valve 126 to sump as at 130. When solenoid 128 of valve 126 is energized, pilot cylinder 124 communicates with the hydraulic pressure line 98 through valve 126 and conduit 132. Solenoid 128 of valve 126 is energized or de-energized depending upon the position of a selector switch 134 on the control panel of the machine tool. When the selector switch 134 is turned to the multicut position shown in the drawings, solenoid 128 is de-energized. When selector switch 134 is turned to the "single cut" position, solenoid 128 is energized.

To initially set up the recycling mechanism, a finish machined master part is chucked between centers as at 151 or otherwise mounted in the operative position on the machine tool. The corresponding template 42 is fixedly mounted on the bed 10 of the machine as by the template support bracket 153. In comparing the rough bar stock blank 58 with the master part, the number of cuts and the depth of each cut required to turn the bar stock down to the size of the master part can be readily determined. For the purpose of illustration, let us assume that to machine the finished work piece 50 from the bar stock 58, approximately ¾" of stock has to be removed from the bar stock in order to produce the cylindrical end portion 52. Let us further assume that it is desired to remove this ¾" of stock in a series of three cuts. First, the adjusting screw 78 of the multi-cut cylinder 72 is backed off so that the total permissible stroke of piston 74 is approximately ½". Adjusting screw 78 is calibrated so that the extent to which it is backed off is readily determinable. For the purpose of simplification, let us assume that the cross sectional area of the rod end of metering cylinder 92 is equal to the cross sectional area of the head end of multi-cut cylinder 72. With these equal proportions, adjusting screw 97 is backed off so that the total permissible stroke of piston 93 in meeting cylinder 92 is approximately ¼".

After these initial adjustments are made, selector switch 134 is turned to the single cut position. This energizes solenoids 114 and 128. Thus, the rod end of multi-cut cylinder 72 is connected with pump 84. Energizing of solenoid 128 shifts valve 126 so that line pressure from pump 84 is applied to the pilot cylinder 124 to thereby open check valve 120. Thus, the head end of cylinder 72 is conected to sump as at 116 through valve 88. In this condition of the circuit, piston 74 is shifted into contact with the end of adjusting screw 78 and the stylus 40 is thereby fully retracted with respect to the cutting tool 24. The tripper block 66 is shifted to the forward end of guide bar 68. Cross slide cylinder 20 is then actuated to advance the cross slide toward the template and adjusted so that the tracer tip 82 of stylus 40 contacts the straight edge 44 of template 42 and the cutting edge 80 of tool 24 contacts the cylindrical surface 52 at the small diameter end of the master part. The exact positioning of the stylus 40 with respect to the cutting tool 24 can be obtained by manipulation of the adjusting screws 154 and 156 associated with microslides 36 and 38, respectively. In this position of the carriage, tripper block 66 is located forwardly of the roller plunger 140 of switch 64. Then the longitudinal feed cylinder 14 is actuated to advance the stylus along the template to the straight edge 46 which corresponds to the larger diameter cylindrical end portion of the master part. The longitudinal feed is then arrested and tripper block 66 is shifted rearwardly to a position slightly forward of the roller plunger 140 of the multicycle switch 64. The mechanism is thus conditioned for automatic multi-cycling operation on a bar stock blank.

In operation, the bar stock blank is chucked in the machine tool in place of the master part which was utilized for set-up purposes. The system is in the idling condition shown in FIG. 1 with the carriage 12 and cross slide 16 fully retracted. In this position, solenoids 114 and 104 are de-energized. Thus, the head end of cylinder 72 and the rod end of cylinder 92 are filled with oil from pump 84. Piston 74 is disposed at the rod end of cylinder 72 so that the cutting edge 80 of cutting tool 24 and the follower tip 82 of stylus 40 are spaced apart a minimum distance. Piston 74 is spaced ½" from the end of adjusting screw 78. Piston 93 is disposed at the head end of cylinder 92 so that the end of piston rod 95 is spaced ¼" from the end of adjusting screw 97. The rod end of cylinder 72 is connected to sump through valve 88 as at 116 and the head end of cylinder 92 is connected to sump through valve 100 as at 106. Since, as pointed out previously, the adjustable check valve 112 is adjusted to relieve at a pressure higher than that developed by pump 84, pump pressure is applied to the head end of cylinder 72 and the rod end of cylinder 92 through valve 88 and conduit 118.

To initiate the recycling mechanism, a cycle start button 136 on the control panel is depressed. When cycle start button 136 is depressed, solenoid 114 of valve 88 is energized to shift valve 88 and thereby apply pump pressure to the rod end of cylinder 72 through conduit 90. However, since the head end of cylinder 72 and the rod end of cylinder 92 are filled with oil and since check valve 120 prevents the discharge of oil to sump as at 116, the system merely remains loaded and neither piston 74 nor piston 93 move. However, when the cycle start button 136 is depressed, the cross slide cylinder 20 is actuated so as to advance cross slide 16 toward the work. When the stylus 40 engages the straight edge 44 on template 42, a pressure switch (not illustrated) energizes the carriage cylinder 14 so as to start the longitudinal feed. Thus, the first cut is initiated on the work piece along the line designated 138 in FIG. 2. This cut is approximately ¼" in depth. As the stylus 40 moves along the inclined edge 48 on template 42, the carriage retracts to the position illustrated in FIG. 2. Tripper block 66 engages the roller plunger 140 of limit switch 64 to actuate this switch. Switch 64 is actuated by tripper block 66 only in the retracting direction of cross slide 16. When limit switch 64 is actuated, it energizes solenoid 104 of valve 100. Valve 100 thus shifts from the position shown in FIG. 1 to the position shown in FIG. 2 so that pump pressure is applied to the head end of cylinder 92. The differential areas on the opposite sides of piston 93 are in a ratio of preferably about 2:1 such that when pump pressure is applied to the head end of cylinder 92, a pressure of approximately twice the pump pressure can be developed in the rod end of cylinder 92. Since check valve 96 prevents the flow of oil from cylinder 92 to either sump at 116 or to the head end of cylinder 72, check valve 112 which is set to relieve at the higher pressure opens and permits the discharge of oil from the rod end of cylinder 92 until the end of piston rod 95 abuts against the end of adjusting screw 97.

In addition to energizing solenoid 104, switch 64 when actuated also energizes piston-cylinder assemblies 14 and 20 to retract the carriage 12 and cross slide 16, respectively, to the starting position. Thus, tool 24 breaks out of the cut at the point designated 142 in FIG. 2 and the carriage returns to the position ililustrated in FIG. 1 so as to actuate limit switch 60. When limit switch 60 is actuated by carriage 12, it de-energizes solenoid 104. Valve 100, which, as illustrated, is spring biased, thus shifts back to the position illustrated in FIG. 1 wherein the head end of cylinder 92 is again connected with sump at 106. Piston 93 is thereby shifted ¼" to the left to bottom against the head end of cylinder 92 by reason of the pump pressure applied through the head end of cylinder 72. Since the pressure in the rod end of cylinder 92 is momentarily relieved, piston 74 in cylinder 72 is shifted ¼″ toward the head end of cylinder 72, that is, a distance such that the oil displaced from cylinder 72 equals the oil displaced from cylinder 92 when piston 93 moves from the position illustrated in FIG. 2 back to the position illustrated in FIG. 1. Thus, the multi-cut slide 32 is retracted ¼″ on cross slide 16.

It is therefore apparent that cylinder 92 is a measuring or metering cylinder and the amount of oil metered from cylinder 72 to cylinder 92 at the end of each cycle of the tool is controlled by the setting of adjusting screw 97. In other words, adjusting screw 97 controls the stroke of piston 93 which in turn controls the amount of hydraulic fluid displaced from cylinder 72 and this, of course, determines the extent to which the stylus is retracted on cross slide 16 in a direction away from cutting tool 24.

When switch 60 is actuated, in addition to de-energizing solenoid 104, it also energizes the cross slide piston-cylinder assembly 20 to again advance tool 24 and stylus 40 toward the work piece 58 and template 42, respectively. As was the case with the first cut described, when the stylus 40 engages the straight edge 44 of template 42, a pressure switch is actuated which energizes feed cylinder 14 and thus causes the cutting edge 80 of cutting tool 24 to follow the line 144 on the work piece as shown in FIG. 2. Thus, the second cut is made on the work piece. In the course of the second cut on the work piece, when the tool breaks out of the cut at the point designated 146 in FIG. 2, the tripper block 66 again trips limit switch 64 to energize solenoid 104 and actuate cylinders 20 and 14 to retract the slide and carriage and again discharge a predetermined quantity of oil from the rod end of cylinder 92. During the second cut, piston 74 in cylinder 72 occupies the position indicated by broken lines at 148 in FIG. 2. However, when the carriage 12 is retracted to the start position so as to again actuate limit switch 60 and thereby de-energize solenoid 104, piston 74 in cylinder 72 moves another ¼″ from the broken line position designated by numeral 148 in FIG. 2 to the position shown in full lines in FIG. 3 where the piston 74 abuts against the end of adjusting screw 78. Thus, stylus 40 is again retracted away from cutting tool 24 and the system is conditioned for the third and finish cut which is illustrated in FIG. 3.

In the showing of FIG. 3, it will be observed that when the stylus 40 reaches the point 150 on template 42, the cutting tool is at the point 152 on work piece 58. In view of the fact that at this point, cross slide 16 has not retracted sufficiently to trip limit switch 64, the feed cylinder 14 continues to feed carriage 12 to the left so that the stylus 40 follows the straight edge 46 while the cutting tool 24 cuts the finish dimension on the large cylindrical end 54 of the spindle. When the carriage completes its longitudinal feed, it engages limit switch 62. When limit switch 62 is actuated, it energizes solenoid 104 to dump the oil in the head end of metering cylinder 92. At the same time, limit switch 62 actuates cylinder 20 and cylinder 14 to retract the cross slide 16 and carriage 12 to the starting position wherein the carriage actuates limit switch 60. However, limit switch 62 also drops out a master relay so that when limit switch 60 is actuated with the master relay dropped out, switch 60 merely de-energizes solenoid 114 to again fill the head end of cylinder 72 and the rod end of cylinder 92 with oil under pressure from pump 84. Thus, multicut slide 32 is advanced to its starting position and the metering piston 93 in cylinder 92 bottoms against the head end of the cylinder. The system then operates idly until the cycle start button 136 is again depressed.

I claim:

1. In a machine tool of the type having means for supporting a work piece to be machined, a cutting tool, a stylus, a fixed template and hydraulic motor means for moving the stylus and cutting tool as a unit along parallel paths as controlled by the configuration of the template to cut a contour on the work piece which corresponds to the configuration of the template, said hydraulic motor means being adapted to move the stylus and cutting tool as a unit toward the template and thereby bring the stylus into contact with the template and away from the template to retract the cutting tool from the workpiece, the improvement which comprises in combination a support for the cutting tool, a support for the stylus, one of said supports being mounted for movement on the other to vary the distance between the cutting tool and the stylus and thereby control the depth of cut on the work piece, a piston-cylinder assembly independent of said hydraulic motor means and operatively interconnecting said supports, a source of hydraulic fluid under pressure connected to one end of said cylinder, a second piston-cylinder assembly, means connecting the other end of the first cylinder with one end of the second cylinder, valve means for connecting the other end of the second cylinder to a source of fluid under pressure and to exhaust, valve means for preventing flow of fluid from the second cylinder to the first, valve means for connecting said one end of the second cylinder to exhaust and means responsive to retraction of said support for the cutting tool to a predetermined position relative to the template for actuating the first valve means to first connect said other end of the second cylinder to said source of pressure to thereby exhaust a predetermined volume of fluid from the first end of the second cylinder and then connect said other end of the second cylinder with exhaust to permit said one end of the second cylinder to be replenished with fluid from said other end of the first cylinder by reason of the pressure of said source of hydraulic fluid applied to said one end of the first cylinder.

2. The combination set forth in claim 1 wherein the stroke of the piston in each cylinder is adjustable.

3. The combination set forth in claim 1 wherein the second and third mentioned valve means comprise check valves.

4. The combination set forth in claim 3 wherein the check valve comprising the third valve means is set to relieve at a pressure higher than said fluid pressure source and said one end of the second cylinder has an effective area less than the effective area of said other end of the second cylinder.

5. The combination set forth in claim 1 wherein said means, responsive to retraction of said support for the cutting tool to a pre-determined position relative to the template, is operative to actuate said hydraulic motor means to retract the cutting tool away from the workpiece.

6. In a machine tool of the type having a bed, a carriage, means for moving the carriage longitudinally along said bed, a cross slide, means comprising a hydraulic motor for moving the cross slide on the carriage in a direction transversely of the path of travel of the carriage on the bed, a template fixedly mounted on the bed and a cutting tool and stylus mounted on the cross slide, said hydraulic motor being adapted to advance the stylus into contact with the template and to thereafter cause the cutting tool to trace a path parallel to the contour of the template when the carriage is moved longitudinally of said bed, the improvement which comprises in combination means supporting the stylus on the cross slide for movement relative to the cutting tool in a direction such as to vary the depth of cut of the cutting tool on the work piece, a first piston-cylinder assembly independent of said hydraulic motor and interconnecting the cross slide and the stylus support, a source of hydraulic fluid under pressure connected to one end of said first cylinder, a second piston-cylinder assembly, means connecting the other end of said first cylinder with one end of said second cylinder, valve means for connecting the other end of the second cylinder to said source of fluid under pressure and to exhaust, valve means for preventing flow of fluid from the second cylinder to the first, valve means for connecting said one end of the second cylinder to exhaust, means responsive to retraction of the cross slide to a predetermined position on said carriage for connecting said other end of the second cylinder to said source of fluid under pressure to thereby displace a predetermined quantity of fluid from said one end of said second cylinder to exhaust, said last mentioned means also being operative to retract the carriage and cross slide towards starting position where the stylus is out of contact with the template and means responsive to movement of the carriage to said starting position to connect said other end of the second cylinder to exhaust to thereby permit said one end of the second cylinder to be replenished with fluid from said other end of the first cylinder by reason of the pressure of said source applied to said one end of the first cylinder, said last mentioned means also being operative to initiate the feed cycle of said carriage and cross slide.

7. The combination set forth in claim 6 including valve means for optionally connecting said hydraulic pressure source with said one end and said other end of the first cylinder and means responsive to movement of the carriage to a fully advanced position for actuating said last mentioned valve means to connect said pressure source with said other end of the first cylinder and said one end of the second cylinder to exhaust, said last mentioned means also being operative to retract the carriage and cross slide and to render inoperative said means for initiating the feed cycle of the carriage and cross slide.

8. The combination set forth in claim 6 wherein said means responsive to retraction of the cross slide to a predetermined position on the carriage includes a switch member and a switch actuating member, one of said members being mounted on the cross slide and the other on the carriage, one of said members being adjustable relative to the other to enable adjustment of the position of the cross slide effective to actuate said switch member.

9. The combination set forth in claim 6 including means for optionally connecting said other end of the first cylinder to exhaust.

References Cited by the Examiner
UNITED STATES PATENTS

| | | | |
|---|---|---|---|
| 2,531,340 | 11/50 | Mathys | 91—35 |
| 2,913,945 | 11/59 | Granberg et al. | 82—14 |
| 3,020,791 | 2/62 | LeBrusque | 82—14 |

WILLIAM W. DYER, JR., *Primary Examiner.*
LEON PEAR, R. H. EANES, *Examiners.*